3,299,038
N-SUBSTITUTED-1,3-DIPHENYL-3-TRIAZENE-
CARBOXAMIDE COMPOUNDS
Andrew Stephen Tomcufcik, Old Tappan, N.J., and
Ralph Grassing Child and Adolph Whitten Vogel,
Pearl River, N.Y., assignors to American Cyanamid
Company, Stamford, Conn., a corporation of Maine
No Drawing. Filed July 6, 1964, Ser. No. 380,667
3 Claims. (Cl. 260—140)

The present application is a continuation-in-part of our copending application Serial No. 259,433, filed February 18, 1963, and now abandoned.

This invention relates to new organic compounds. More particularly, it relates to substituted 3-triazene carboxamides and methods of preparing the same.

The novel compounds of the present invention can be illustrated by the following formula:

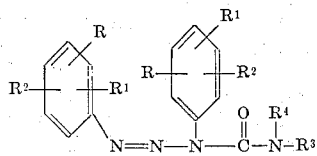

wherein R, $R^1$ and $R^2$ are selected from the group consisting of hydrogen, lower alkyl, lower alkoxy, halogen, nitro trifluoromethyl, lower alkyl mercapto, lower alkylamino, lower carboxylic acyloxy and lower carboxylic acylamino radicals and $R^3$ and $R^4$ are selected from the group consisting of hydrogen, lower alkyl, cycloalkyl, cyano(lower)alkyl, propargyl and alkenyl and

taken together represent pyrrolidino, piperidino, morpholino, lower alkylpiperazino and 1,2,5,6-tetrahydropyridyl radicals.

The compounds of the present invention are, in general, crystalline solids. They are insoluble in water and slightly soluble in lower alkanols, lower alkoxy alkanols, tetrahydrofuran, acetone and the like.

The present compounds can be prepared by reacting an appropriate 1,3-diphenyl triazene with an isocyanate. This reaction can be illustrated as follows:

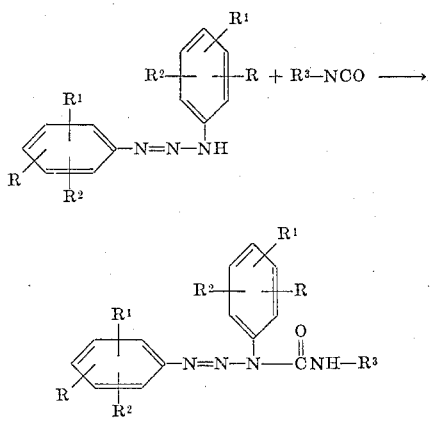

wherein R, $R^1$, $R^2$ and $R^3$ are as defined above. The reaction is usually carried out in ether although other solvents such as chloroform, benzene, tetrahydrofuran and the like can be used. In practice, it has been found convenient to prepare separate solutions of each reactant and then to combine the two solutions and allow the combined solution to stand for a period of from 30 minutes to 4 hours at room temperature in order to complete the reaction. Generally, the product precipitates or can be precipitated from solution and is separated by filtration. The product may be purified by recrystallization as shown hereinafter in the examples.

The starting materials in the above process can be, for example, 1,3-diphenyltriazine; 1,3-bis-(4-lower alkylphenyl)triazine; 1-(3-lower alkylphenyl)-3-(4-lower alkylphenyl)triazine; 1,3-bis-(4-lower alkoxyphenyl)triazine; 1,3-bis-(4-halophenyl)triazine; 1,3-bis-(4-nitrophenyl)-triazine; 1,3-bis-(4-lower alkylaminophenyl) triazine; 1,3-bis(4-acetamidophenyl)triazene; 1,3-bis-(5-chloro-o-tolyl)-triazene; 1,3-bis($\alpha,\alpha,\alpha$-trifluoro-m-tolyl)-triazene; 1,3-bis[p-(methylthio)phenyl]-triazene; 1,3-bis(3,4,5-trimethoxyphenyl)triazene and the like.

When the product desired is one in which $R^3$ is hydrogen a 1,3-diaryl triazene may be reacted with an isocyanate salt such as sodium or potassium isocyanate and acid. This reaction may be illustrated as follows:

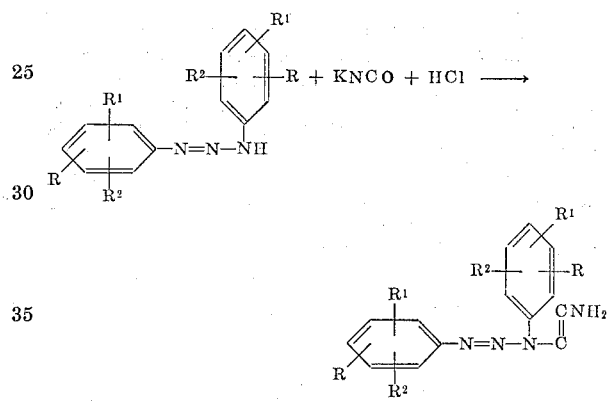

wherein $R^1$ and $R^2$ are as defined above. This reaction is conveniently carried out by stirring a mixture of an aqueous solution of the isocyanate salt and the desired 1,3-diphenyltriazene in a solution. The reaction is preferably carried out at a temperature within the range of $-10°$ to $15°$ C. while adding aqueous acid.

When the products desired are N,N-di-substituted-1,3-diaryl-3-triazenecarboxamides they are prepared by the following general method:

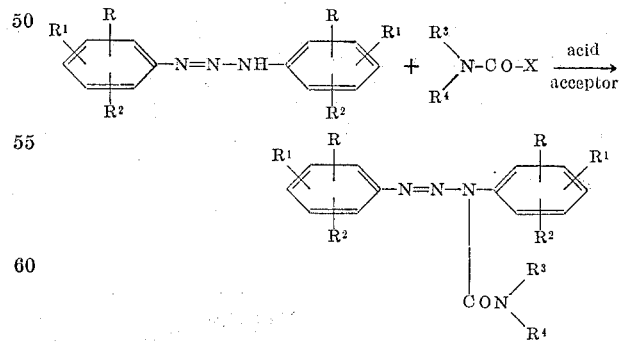

wherein R, $R^1$, $R^2$, $R^3$, $R^4$ are as previously described and X is a reactive halogen. This reaction is conveniently carried out in an inert solvent and the temperature is not critical. Suitable acid acceptors which are preferable to obtain higher yields include sodium methylate, triethyl amine, sodium amide and the like. This reaction is also conveniently carried out by forming an alkali salt of the 1,3-diaryltriazene, for example, with sodium hydride and allowing the salt to react with the appropriate dialkylcarbamyl halide. Suitable dialkylcarbamyl halides include dimethylcarbamyl chloride, piperidinecarbamyl chloride, methyl allyl carbamyl chloride, diethylcarbamyl bromide and the like.

The compounds of the present invention have been found to have anti-inflammatory activity when tested in rats by the carrageenin test, a standard method of measuring anti-arthritic activity.

*Anti-inflammatory screening (A)*.—Groups of two rats each are injected subcutaneously at the midline of the shaved sacral region with 0.5 ml. of a 2% aqueous carrageenin solution. (Carrageenin is a polygalactose sulfate extracted from Irish moss, a type of sea-weed. Subcutaneous injection of carrageenin causes rapid formation of an intense subcutaneous inflammatory reaction which subsequently develops into a connective tissue granuloma). The compounds of this invention are suspended in aqueous 1% starch-sodium phosphate buffer solution; pH 6.5, and administered by oral tubing in 0.5 ml.; the total dose for each animal is 250 mg./kg. of body weight. One-half of each total dose is administered immediately following the carrageenin injection, and the second half of each total dose 4 hours later. Alternately, the total dose for each animal may be injected all at once immediately following the carrageenin injection. The animals are killed 24 hours after the carrageenin injections. The inflammatory reaction to the carrageenin results in the formation of exudate and gelatinous material which is removed and weighed. Control animals receive the carrageenin injection and the starch-sodium phosphate buffer solution orally without the test agent. Critical ratios ($C/T$=the ratio of weight of exudate and gelatinous material from control animals to weight of same from test animals) are calculated, and compared by a 3-stage sequential screening procedure:

| Stage | Reject (C/T ratio) | Accept (C/T ratio) |
|---|---|---|
| 1 | $(C/T)_1$ | 1.11 or below | 1.65 or above. |
| 2 | $(C/T)_1 \times (C/T)_2$ | 1.49 or below | 2.23 or above. |
| 3 | $(C/T)_1 \times (C/T)_2 \times (C/T)_3$ | Below 2.46 | 2.46 or above. |

The above ratios represent a statistically designed method for detecting anti-inflammatory activity which is significantly different than the variability of control animals at the 95% confidence level. Thus, a compound which on the first stage give a $(C/T)_1 = 1.11$ or below is rejected; if the ratio is between 1.11 and 1.65 the compound is re-tested; and if the ratio is 1.65 or above the compound is accepted as active. On the second stage (re-test because $(C/T)_1$ is between 1.11 and 1.65), if the product $(C/T)_1 \times (C/T)_2$ is 1.49 or below the compound is rejected; if this product is between 1.49 and 2.23 the compound is given a third trial; if 2.23 or above the compound is accepted. On the third stage if the product $(C/T)_1 \times (C/T)_2 \times (C/T)_3$ is less than 2.46 the compound is rejected as inactive; but if this product is 2.46 or above the compound is accepted as an active anti-inflammatory agent.

When the compounds of this invention are tested by the above procedure, the following results are obtained:

| Compound | Product of C/T Ratios (Stage Accepted) |
|---|---|
| N-allyl-1,3-bis(p-methoxyphenyl)-3-triazenecarboxamide | 3.38 (2) |
| N-ethyl-1,3-bis(p-methoxyphenyl)-3-triazenecarboxamide | 1.68 (1) |
| N-allyl-1,3-diphenyl-3-triazenecarboxamide | 2.81 (1) |
| 1,3-diphenyl-3-triazenecarboxamide | 3.16 (1) |
| N-ethyl-1,3-diphenyl-3-triazenecarboxamide | 2.81 (1) |
| N-(2-cyanoethyl)-1,3-diphenyl-3-triazenecarboxamide | 2.28 (1) |
| N-(9-decenyl)-1,3-diphenyl-3-triazenecarboxamide | 2.21 (1) |
| N-allyl-1,3-bis(p-acetoxyphenyl)-3-triazenecarboxamide | 2.54 (1) |
| N-ethyl-1,3-bis(p-methylmercaptophenyl)-3-triazenecarboxamide | 1.69 (1) |
| N-allyl-1,3-bis(p-ethylphenyl)-3-triazenecarboxamide | 1.72 (1) |
| N-allyl-1,3-bis(o-methoxyphenyl)-3-triazenecarboxamide | 2.67 (2) |
| N-ethyl-1,3-bis(o-methoxyphenyl)-3-triazenecarboxamide | 2.39 (1) |

*Anti-inflammatory evaluation (B)*.—The general procedure of (A) is repeated. The carrageenin granuloma is produced in the same manner and the method of administration of the test agents is identical. However, about 5 graded doses of the test agent (accepted as active in the screening procedure and confirmed by replication of the screening procedure) are administered to 4 rats at each dose level. Mean abscess weights of the control and treated groups are recorded. The entire experiment is replicated three times, the results are subjected to statistical analysis, and a dose-response curve is calculated. This data is used to calculate effective dose levels for relative potency comparisons. For example, the $ED_{29}$ is defined as the dose of a test agent which produces a 29% reduction of mean abscess weights compared to the control groups. The 29% reduction of inflammatory response represents the mid-point of the dose-response curve for the anti-inflammatory drug, phenylbutazone, and is used for relative potency comparisons with this drug. An $ED_{50}$ is defined as the dose of a test agent which produces a 50% reduction in the subcutaneous inflammatory response to carrageenin as measured by the mean abscess weights. The $ED_{50}$ may also be used for relatively potency comparisons.

Toxicity: Groups of ten rats each are administered graded doses of the test agent by oral tubing and observed daily for 7 to 14 days. The cumulative number of deaths in each group at each dose level is recorded and this data is used to calculate an $LD_{50}$ by the method of Litchfield and Wilcoxon. The $LD_{50}$ is the median lethal dose which causes 50% mortality.

The effective doses ($ED_{29}$ and $ED_{50}$) and median lethal doses ($LD_{50}$) are compared for a given test agent to demonstrate that the anti-inflammatory activity is obtained at non-toxic dose levels with a desirably wide spread between the effective and toxic dose levels. An anti-inflammatory index (ratio of the lethal to the $ED_{29}$ dose levels) may be calculated.

When representative active compounds of the present invention are evaluated by the above described procedures the following results are obtained:

| Compound | $ED_{29}$ mg./kg. p.o. | $ED_{50}$ mg./kg. p.o. | $LD_{50}$ mg./kg. p.o. | Anti-inflammatory Index ($LD_{50}/ED_{29}$) |
|---|---|---|---|---|
| N-allyl-1,3-bis-(p-methoxyphenyl)-3-triazenecarboxamide | 9 | 70 | >1,000 | >110 |
| N-allyl-1,3-diphenyl-3-triazenecarboxamide | 15 | 54 | 620 | 41 |
| 1,3-diphenyl-3-triazenecarboxamide | 20 | 67 | 255 | 13 |
| N-(2-cyanoethyl)-1,3-diphenyl-3-triazenecarboxamide | 19 | 66 | 700 | 37 |
| N-(9-decenyl)-1,3-diphenyl-3-triazenecarboxamide | 75 | 630 | >3,000 | >40 |
| N-ethyl-1,3-diphenyl-3-triazenecarboxamide | 9 | 62 | 368 | 41 |
| N-allyl-1,3-bis-(p-acetoxyphenyl)-3-triazenecarboxamide | 8 | 27 | | |

*Anti-inflammatory activity by local administration (C).*—The general procedure of (B) is repeated. The carrageenin granuloma is produced in the same manner, but the test agents are administered subcutaneously into the same site as the carrageenin injection immediately following the carrageenin injection.

Graded doses are administered to 4 rats at each dose level and the 24 hour mean abscess weights of the control and treated groups are recorded. The results are subjected to statistical analysis, a dose-response curve is calculated and effective dose levels are determined.

When representative active compounds of the present invention are evaluated by the above-described procedure, the following results are obtained:

| CL No. | Compound | $ED_{29}$ mg./kg. s.c. | $ED_{50}$ mg./kg. s.c. |
| --- | --- | --- | --- |
| 61,019 | N-allyl-1,3-bis(p-methoxyphenyl)-3-triazenecarboxamide | 0.4 | 1.2 |
| 17,862 | N-ethyl-1,3-diphenyl-3-triazenecarboxamide | 2.4 | 34 |

The compounds of the present invention when tested as described above have been found to be active anti-inflammatory agents and therefore will be useful in the treatment of arthritis, bursitis, burns and the like.

The compounds of the present invention are useful as active components of pharmaceutical preparations presented for administration in unit dosage form as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantageous enteric coating comprises a styrene maleic acid copolymer together with known materials contributing to the enteric properties of the coating.

The liquid forms in which the novel composition of the present invention may be incorporated for administration include aqueous solutions and suspensions, suitable flavored syrups, oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also high desirable for injection use.

The substituted triazenecarboxamides of this invention are highly useful anti-inflammatory agents. They show excellent anti-inflammatory action at very low doses and possess distinct advantages over other non-steroid anti-inflammatory drugs such as the salicylates and phenylbutazone. The spread between the effective dose and the lethal dose is advantageously very large, with ratios of lethal to effective doses of about 100 to 1000 for representative compounds of this invention. The valuable anti-inflammatory properties of the compounds of this invention are readily demonstrated since they markedly reduce the size of a subcutaneous carrageenin-induced inflammatory granuloma. They are generally administered orally or locally, and when so administered may be considered anti-inflammatory agents for the therapeutic treatment of rheumatoid disorders and other inflammatory conditions at individual doses ranging from about 5 to about 300 milligrams. The dosage regimen can be adjusted to provide optimum therapeutic response. Thus, for example, several doses may be administered daily, or the dose may be reduced proportionately as indicated by the exigencies of the therapeutic situation. It is also possible to adjust the dosage regimen so that individual doses are given intermittently at intervals of from several days to about a week or more with maintenance of an effective level of anti-inflammatory action. The active compositions of this invention may also be considered therapeutically useful by parenteral administration such as local injection into the inflamed area. For example, they may be administered by intra-articular injection into an inflamed joint. Other examples of parenteral routes for the therapeutic administration of the compounds of this invention include intramascular and intravenous administration of solutions and/or suspensions.

A detailed description of the preparation of representative compounds of the present invention is given in the following examples.

EXAMPLE 1

*Preparation of N-ethyl-1,3-diphenyl-3-triazenecarboxamide*

A solution of 3.5 g. of ethylisocyanate in 50 ml. of dry diethyl ether is mixed with a solution of 10.0 g. of 1,3-diphenyltriazene in 50 ml. of dry diethyl ether. After standing at room temperature for one hour, the precipitated compound is collected, washed with ether, and dried under reduced pressure at room temperature. The compound melts at 126°–127° C. with decomposition.

EXAMPLE 2

*Preparation of N-isopropyl-1,3-diphenyl-3-triazenecarboxamide*

Following the procedure of Example 1, but using an equimolar quantity isopropyl isocyanate in place of ethyl isocyanate, the above compound is obtained, melting point 110° C. with decomposition.

EXAMPLE 3

*Preparation of N-(β-cyanoethyl)-1,3-diphenyl-3-triazenecarboxamide*

In a 500 ml. flask, 9.9 g. (0.05 mole) of 1,3-diphenyltriazene is dissolved in 100 ml. of ether and treated all at once with a solution of 4.8 g. (0.05 mole) of β-cyanoethylisocyanate in 15 ml. of ether. A precipitate forms rapidly. The reaction is cooled in a refrigerator, filtered, washed with ether and dried, wt. 11.3 g. (77%), melting point 108°–110° C. with decomposition. Some material is lost in recrystallization attempts since the product proved to be unstable on standing in methanol. However, by dissolving rapidly in boiling methanol, filtering, seeding, cooling and filtering the product within one-half hour, there is obtained 3.2 g. of pale yellow crystals, melting point 118° C. with decomposition.

EXAMPLE 4

*Preparation of N-(9-decenyl)-1,3-diphenyl-3-triazenecarboxamide*

In a 500 ml. flask 9.9 g. (0.05 mole) of 1,3-diphenyltriazene dissolved in 100 ml. of ether is treated with 9.06 g. (0.05 mole) of 9-deceneisocyanate dissolved in 15 ml. of ether. No precipitate appears after 2 hours at room temperature and overnight at 3° C. The solution is then allowed to stand at room temperature for 24 hours and then overnight at 3° C. When nothing comes down at this point a little ether is removed under reduced pressure causing a sudden formation of crystals which solidify the medium. The mass is filtered, washed with ether and twice with hexane leaving (A) a pale yellow powder, wt. 7.0 g., melting point 71°-72° C. The mother liquor and washings on standing deposit a second crop, which is filtered and washed as above giving (B) a yellow powder, wt. 5.0 g., melting point 68.3°-69.5° C. Recrystallization of B from hexane gives (C) wt. 3.2 g., melting point 71°-72° C. making a total yield of 10.2 g. (54%).

EXAMPLE 5

*Preparation of N-allyl-1,3-diphenyl-3-triazenecarboxamide*

In a 250 ml. flask, 9.9 g. (0.05 mole) of 1,3-diphenyltriazene is dissolved in 75 ml. of ether and treated with 4.15 g. (0.05 mole) of allyl isocyanate in 10 ml. of ether at room temperature. After standing at room temperature for 24 hours and at 3° C. for three days the crystals are filtered, washed with ether and hexane and dried leaving (A) pale yellow crystals, wt. 0.8 g., melting point 110°-111° C. with decomposition. Work up of the mother liquor and washings gives 4.0 g. of material, melting point 90°-95° C. with decomposition, which on recrystallization from ether-hexane gives (B) yellow rods, wt. 1.1 g., melting point 107°-109° C.

EXAMPLE 6

*Preparation of 1,3-diphenyl-3-triazenecarboxamide*

In a 250 ml. round-bottomed, 3-necked flask fitted with a stirrer, thermometer and a dropping funnel leading to the bottom, there is placed a solution of 1.8 g. (0.023 mole) of potassium cyanate in 20 ml. of water. A solution of 4.0 g. (0.021 mole) of 1,3-diphenyltriazene in 25 ml. of ether is layered on top of the aqueous layer. The flask is cooled to 0° C. by an ice-salt mixture. The stirrer is adjusted to maintain a broken interface but short of emulsification of the layers. To the aqueous layer there is added over 15 minutes, 10 ml. of 2 N hydrochloric acid (0.021 mole) after which the cold bath is removed, the stirrer stopped and the reaction allowed to warm to room temperature. Fine hair like crystals begin to form in the ether layer. After a few hours the crystals are filtered off, washed well with water and finally with ether leaving 1.2 g. pale yellow hairs, melting point 130° C. with decomposition.

EXAMPLE 7

*Preparation of N-allyl-1,3-bis(4-chlorophenyl)-3-triazenecarboxamide*

The compound is prepared by the procedure of Example 5, an equimolar quantity of 1,3-bis(4-chlorophenyl)triazene replacing the 1,3-diphenyltriazene. The pure compound melts at 115° C. with decomposition.

EXAMPLE 8

*Preparation of N-allyl-1,3-bis(p-methoxyphenyl)-3-triazenecarboxamide*

The general procedure of Example 1 is repeated. From this reaction of allyl isocyanate with 1,3-bis(p-methoxyphenyl)-triazene in ether the above compound is obtained, melting point 80°-82° C. with decomposition.

EXAMPLE 9

*Preparation of N-ethyl-1,3-bis(p-methoxyphenyl)-3-triazenecarboxamide*

Following the procedure of Example 1 and reacting ethyl isocyanate with 1,3-bis(p-methoxyphenyl)-triazene in ether the above compound is obtained, melting point 93°-94° C. with decomposition.

EXAMPLE 10

*Preparation of N-allyl-1,3-bis(o-methoxyphenyl)-3-triazenecarboxamide*

The general procedure of Example 1 is repeated. From the reaction of allyl isocyanate with 1,3-bis(o-methoxyphenyl)-triazene in ether the above compound is obtained, melting point 112° C. with decomposition.

EXAMPLE 11

*Preparation of N-ethyl-1,3-bis(o-methoxyphenyl)-3-triazenecarboxamide*

When the procedure of Example 1 is used and ethyl isocyanate is reacted with 1,3-bis(o - methoxyphenyl)-triazene in ether the above compound is obtained, melting point 123°-125° C. with decomposition.

EXAMPLE 12

*Preparation of N-allyl-1,3-bis(p-acetoxyphenyl)-3-triazenecarboxamide*

The general procedure of Example 1 is repeated. From the reaction of allyl isocyanate with 1,3-bis(p-acetoxyphenyl)-triazene in ether the above compound is obtained, melting point 84°-85° C. with decomposition.

EXAMPLE 13

*Preparation of N-allyl-1,3-bis(p-acetamidophenyl)-3-triazenecarboxamide*

Using the procedure of Example 1 and reacting allyl isocyanate with 1,3-bis(p-acetamidophenyl)-triazene in tetrahydrofuran the above compound is obtained, melting point 159° C. with decomposition.

EXAMPLE 14

*Preparation of N-ethyl-1,3-bis(p-acetamidophenyl)-3-triazenecarboxamide*

The general procedure of Example 1 is repeated. From the reaction of ethyl isocyanate with 1,3-bis(p-acetamidophenyl)-triazene in tetrahydrofuran the above compound is obtained, melting point about 160° C. with decomposition.

EXAMPLE 15

*Preparation of N-allyl-1,3-bis(5-chloro-o-tolyl)-3-triazenecarboxamide*

When the procedure of Example 1 is used and allyl isocyanate is reacted with 1,3-bis(5-chloro-o-tolyl)-triazene in ether the above compound is obtained as an oil.

EXAMPLE 16

*Preparation of N-allyl-1,3-bis($\alpha,\alpha,\alpha$-trifluoro-m-tolyl)-3-triazenecarboxamide*

The general procedure of Example 1 is repeated. From the reaction of allyl isocyanate with 1,3-bis($\alpha,\alpha,\alpha$-trifluoro-m-tolyl)-triazene in ether the above compound is obtained as an oil.

EXAMPLE 17

*Preparation of N-allyl-1,3-bis[p-(methylthio)phenyl]-3-triazenecarboxamide*

Using the procedure of Example 1 and reacting isocyanate with 1,3-bis[p-(methylthio)phenyl]-triazene in ether the above compound is obtained, melting point 104°–106° C. with decomposition.

EXAMPLE 18

*Preparation of N-ethyl-1,3-bis[p-(methylthio)phenyl]-3-triazenecarboxamide*

The general procedure of Example 1 is repeated. From the reaction of ethyl isocyanate with 1,3-bis[p-(methylthio)phenyl]-triazene in ether the above compound is obtained, melting point 105°–106° C. with decomposition.

EXAMPLE 19

*Preparation of N-allyl-1,3-bis(p-ethylphenyl)-3-triazenecarboxamide*

When the procedure of Example 1 is repeated and allyl isocyanate is reacted with 1,3-bis(p-ethylphenyl)-triazene in ether the above compound is obtained, melting point 112°–114° C. with decomposition.

EXAMPLE 20

*Preparation of N-ethyl-1,3-bis(p-ethylphenyl)-3-triazenecarboxamide*

The general procedure of Example 1 is repeated. From the reaction of ethyl isocyanate with 1,3-bis(p-ethylphenyl)-triazene in ether the above compound is obtained, melting point 116–118° C. with decomposition.

EXAMPLE 21

*Preparation of N-propyl-1,3-diphenyl-3-triazenecarboxamide*

Using the procedure of Example 1 and reacting propyl isocyanate with 1,3-diphenyltriazene in ether the above compound is obtained, melting point 95°–96° C.

EXAMPLE 22

*Preparation of N-allyl-1,3-bis(3,4,5-trimethoxyphenyl)-3-triazenecarboxamide*

The general procedure of Example 1 is repeated. From the reaction of allyl isocyanate with 1,3-bis(3,4,5-trimethoxyphenyl)triazene in tetrahydrofuran the above compound is obtained, melting point 107°–109° C. with decomposition.

EXAMPLE 23

*Preparation of N-cyclohexyl-1,3-bis(p-methoxyphenyl)-3-triazenecarboxamide*

The procedure of Example 1 is repeated using cyclohexyl isocyanate and 1,3-bis(p-methoxyphenyl)triazene and the above compound is obtained, melting point 126–127° C. with decomposition.

EXAMPLE 24

*Preparation of N-cyclopropylmethyl-1,3-bis(p-methoxyphenyl)-3-triazenecarboxamide*

The procedure of Example 1 is repeated using cyclopropylmethyl isocyanate and 1,3-bis(p-methoxyphenyl)triazene. The above compound is obtained.

EXAMPLE 25

*Preparation of N-propargyl-1,3-bis(p-methoxyphenyl)-3-triazenecarboxamide*

When the procedure of Example 1 is used and propargyl isocyanate is reacted 1,3-bis(p-methoxyphenyl)triazene, the above product is obtained.

EXAMPLE 26

*Preparation of N-iso-propyl-1,3-bis(p-methoxyphenyl)-3-triazenecarboxamide*

The procedure of Example 1 is repeated reacting isopropyl isocyanate with 1,3-bis(p-methoxyphenyl)triazene and the above compound is obtained, melting point 89–90.5° C. with decomposition.

EXAMPLE 27

*Preparation of N-methyl-1,3-bis(p-methoxyphenyl)-3-triazenecarboxamide*

When the procedure of Example 1 is repeated using methyl isocyanate and 1,3-bis(p-methoxyphenyl)triazene, the above compound is obtained, melting point 121°–123° C. with decomposition.

EXAMPLE 28

*Preparation of N-allyl-1,3-bis(m-tolyl)-3-triazenecarboxamide*

The procedure of Example 1 is repeated using allyl isocyanate and 1,3-bis(m-tolyl)triazene. The above compound is obtained.

EXAMPLE 29

*Preparation of N-allyl-1,3-bis(p-ethoxyphenyl)-3-triazenecarboxamide*

When the procedure of Example 1 is repeated using allyl isocyanate and 1,3-bis(p-ethoxyphenyl)triazene, the above compound is obtained.

EXAMPLE 30

*Preparation of N-ethyl-1,3-bis(m-bromophenyl)-3-triazenecarboxamide*

The procedure of Example 1 is repeated. From ethyl isocyanate and 1,3-bis(m-bromophenyl)triazene, the above compound is obtained.

EXAMPLE 31

*Preparation of N,N-dimethyl-1,3-bis(p-methoxyphenyl)-3-triazenecarboxamide*

A solution of 1,3-bis(p-methoxyphenyl)triazene in ether is treated with one equivalent of triethylamine and one equivalent of dimethylcarbamyl chloride. After the reaction is complete, the precipitated triethylamine hydrochloride is separated. The above product is obtained by evaporation of the solvent.

EXAMPLE 32

*Preparation of N,N-diethyl-1,3-diphenyl-3-triazenecarboxamide*

The procedure of Example 31 is repeated using 1,3-diphenyltriazene and diethylcarbamyl chloride and the above compound is obtained.

EXAMPLE 33

*Preparation of 1-[1,3-bis(p-methoxyphenyl)triazene-3-carbonyl]piperidine*

When the procedure of Example 31 is repeated using 1,3-bis(p-methoxyphenyl)triazene and 1-piperidinecarbonyl chloride, the above compound is obtained.

EXAMPLE 34

*Preparation of 4-(1,3-diphenyltriazene-3-carbonyl)-morpholine*

The procedure of Example 31 is repeated, reacting 1,3-diphenyltriazene with 4-morpholinecarbonyl chloride. The above compound is obtained.

EXAMPLE 35

*Preparation of 1-(1,3-diphenyltriazene-3-carbonyl)-pyrrolidine*

When the procedure of Example 31 is repeated using 1,3-diphenyltriazene and 1-pyrrolidine-carbonyl chloride, the above compound is obtained.

EXAMPLE 36

*Preparation of 1-(1,3-bis(p-methoxyphenyl)triazene-3-carbonyl)-4-methylpiperazine*

The procedure of Example 31 is repeated, reacting 1,3-bis(p-methoxyphenyl)triazene with N-methylpiperazine. The above product is obtained.

EXAMPLE 37

*Preparation of 1-(1,3-diphenyltriazene-3-carbonyl)-1,2,5,6-tetrahydropyridine*

When the procedure of Example 31 is repeated using 1,3-diphenyltriazene and 1,2,5,6-tetrahydropyridine-1-carbonyl chloride, the above compound is obtained.

EXAMPLE 38

*Capsules containing N-allyl-1,3-bis(p-methoxyphenyl)-3-triazenecarboxamide*

| Per Capsule, g. | | For 10,000 Capsules, g. |
|---|---|---|
| 0.025 | Active ingredient: N-allyl-1,3-bis(p-methoxyphenyl)-3-triazenecarboxamide. | 250 |
| 0.074 | Lactose | 740 |
| 0.001 | Magnesium stearate (1%) | 10 |
| 0.100 | | 1,000 |

The dry ingredients are thoroughly mixed and 0.100 g. of the mix is placed in each gelatin capsule.

We claim:
1. A compound of the formula:

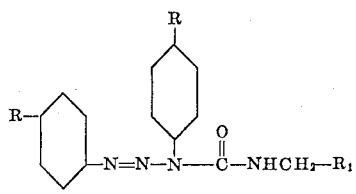

wherein R is selected from the group consisting of hydrogen and lower alkoxy and $R_1$ is selected from the group —CH=CH$_2$ and —CH$_2$CN.

2. The compound N-($\beta$-cyanoethyl)-1,3-diphenyl-3-triazenecarboxamide.

3. The compound N-allyl-1,3-bis(p-methoxyphenyl)-3-triazenecarboxamide.

References Cited by the Examiner

UNITED STATES PATENTS

| | | | |
|---|---|---|---|
| 2,168,800 | 8/1939 | Kracker | 260—140 |
| 2,766,226 | 11/1956 | Hardy | 260—140 |
| 2,994,640 | 8/1961 | Zellner | 167—65 |
| 3,073,743 | 1/1963 | Spero | 167—65 |

FOREIGN PATENTS

| | | |
|---|---|---|
| 893,437 | 4/1962 | Great Britain. |
| 64,730 | 11/1949 | Netherlands. |

OTHER REFERENCES

Beilstein: "Handbuch Der Organischen Chemie," vol. 16, p. 691, (1933).

Bertho, C. A.: vol. 21, p. 2903 (1927).

Hodgson et al.: J. Chem. Soc. (London), vol. of 1943, pp. 221–223.

CHARLES B. PARKER, *Primary Examiner.*

F. D. HIGEL, *Assistant Examiner.*